(12) United States Patent
Auracher

(10) Patent No.: US 6,516,387 B1
(45) Date of Patent: Feb. 4, 2003

(54) SET-ASSOCIATIVE CACHE HAVING A CONFIGURABLE SPLIT AND UNIFIED MODE

(75) Inventor: Stefan Auracher, Baierbrunn (DE)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/918,012

(22) Filed: Jul. 30, 2001

(51) Int. Cl.$^7$ ............................................. G06F 12/00
(52) U.S. Cl. ...................... 711/123; 711/128; 711/129; 711/125; 711/126
(58) Field of Search ................................ 711/128, 123, 711/125, 126, 129

(56) References Cited

U.S. PATENT DOCUMENTS

| | | | | |
|---|---|---|---|---|
| 4,719,568 A | * | 1/1988 | Carrubba et al. | 711/123 |
| 5,025,366 A | * | 6/1991 | Baror | 711/118 |
| 5,553,262 A | * | 9/1996 | Ishida et al. | 711/123 |
| 5,586,303 A | * | 12/1996 | Willenz et al. | 711/118 |
| 5,638,537 A | * | 6/1997 | Yamada et al. | 711/119 |
| 5,706,466 A | * | 1/1998 | Dockser | 711/125 |
| 5,802,574 A | * | 9/1998 | Atallah et al. | 711/118 |
| 5,875,465 A | * | 2/1999 | Kilpatrick et al. | 711/123 |
| 6,427,190 B1 | * | 7/2002 | Hansen | 711/119 |

* cited by examiner

*Primary Examiner*—Hong Kim
(74) *Attorney, Agent, or Firm*—Christopher P. Maiorana, PC

(57) ABSTRACT

A set-associative cache having a selectively configurable split/unified mode. The cache may comprise a memory and control logic. The memory may be configured for storing data buffered by the cache. The control logic may be configured for controlling the writing and reading of data to and from the memory. The control logic may organise the memory as a plurality of storage sets, each set being mapped to a respective plurality of external addresses such that data from any of said respective external addresses maps to that set. The control logic may comprise allocation logic for associating a plurality of ways uniquely with each set, the plurality of ways representing respective plural locations for storing data mapped to that set. In the unified mode, the control logic may assign a first plurality of ways to each set to define a single cache region. In the split mode, the control logic may partition the first plurality of ways to define a first and a second sub-group of ways assigned to each set, to define a respective first and second cache region.

17 Claims, 5 Drawing Sheets

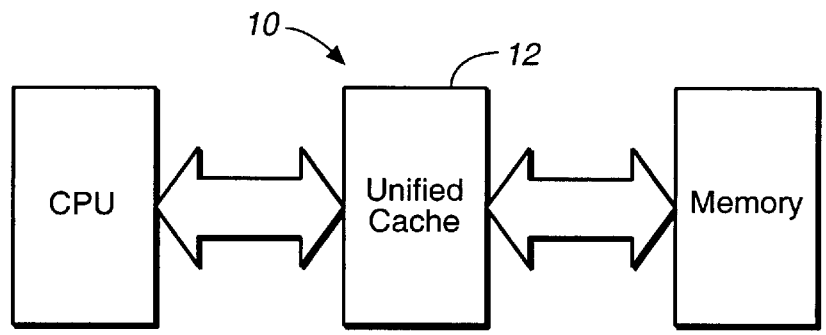
FIG._1A
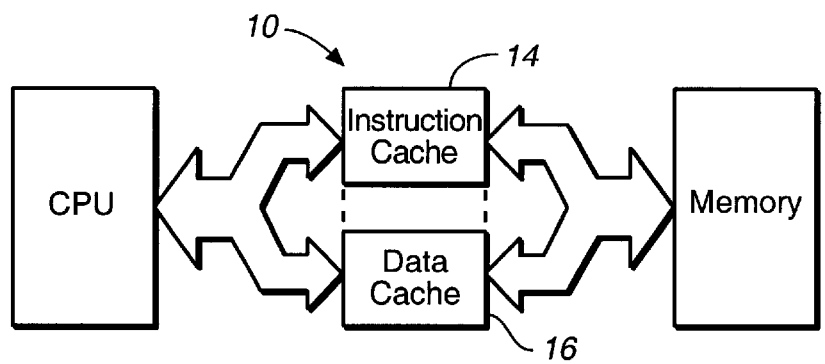
FIG._1B
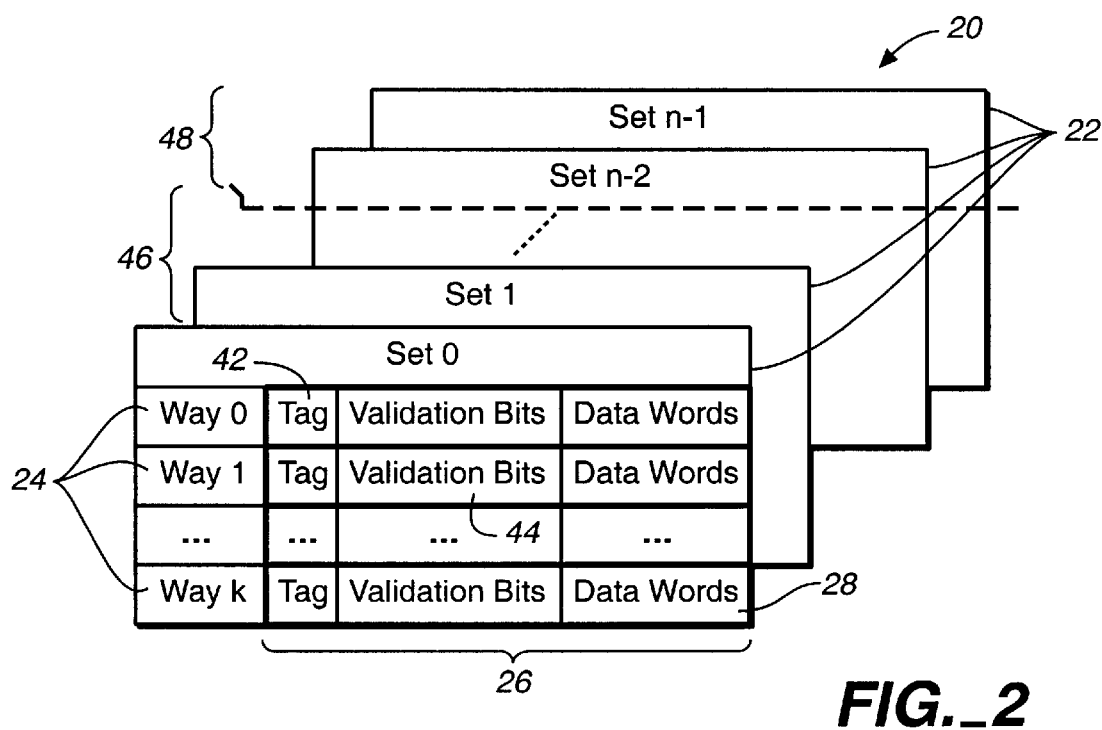
FIG._2

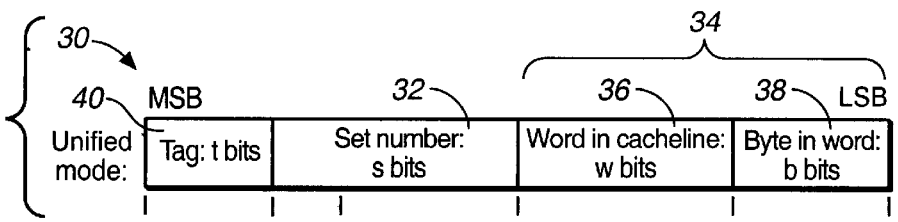
FIG._3
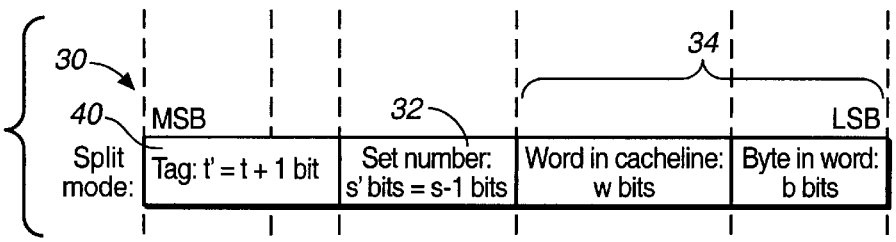
FIG._4
FIG._5

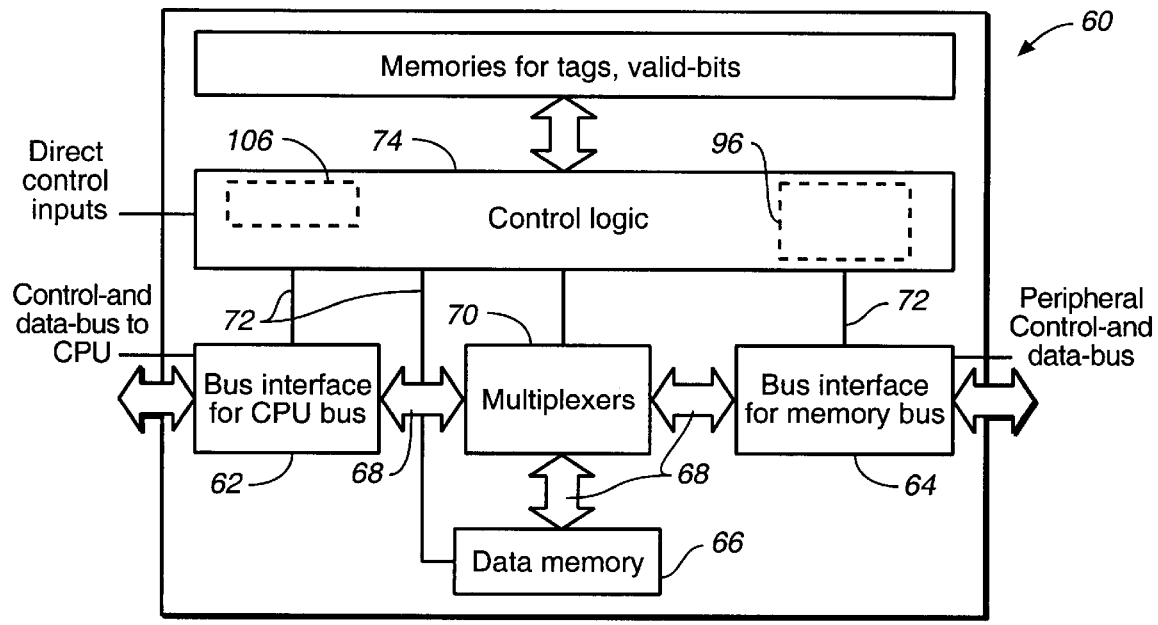
FIG._6
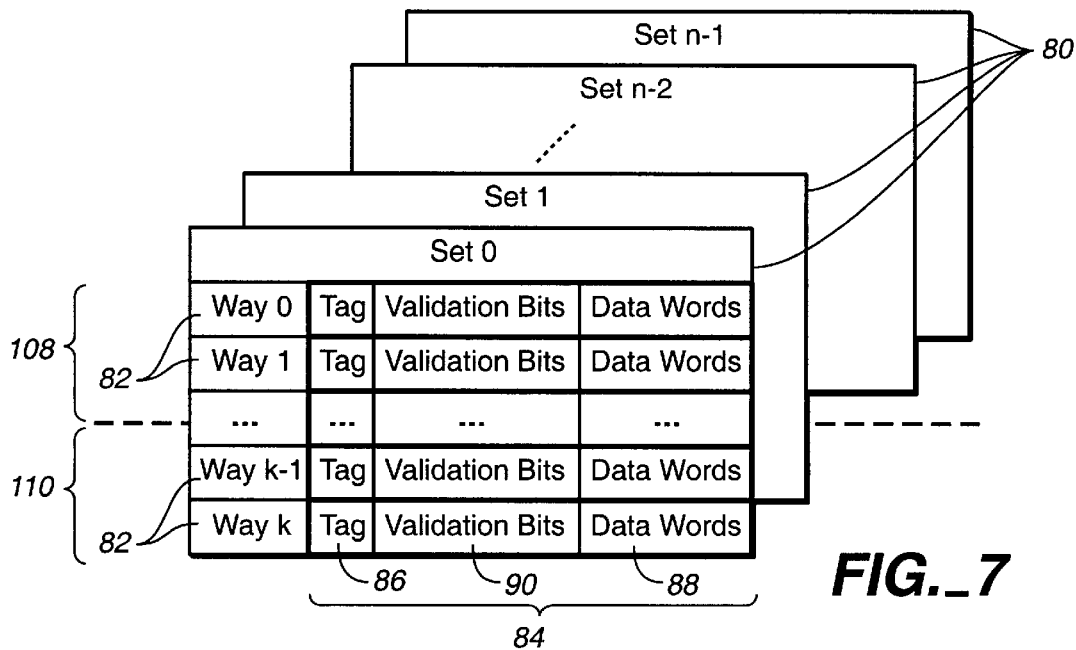
FIG._7

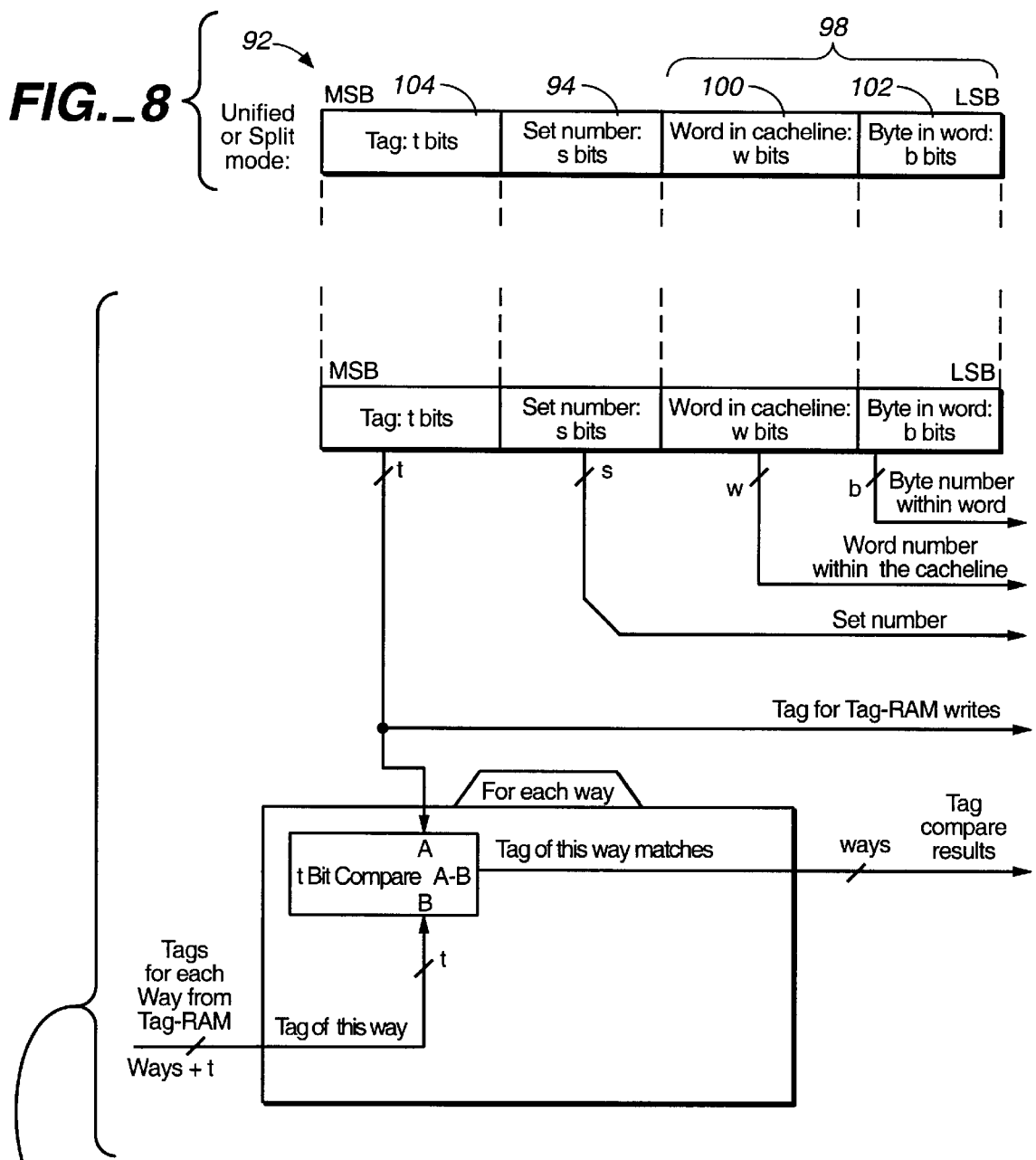

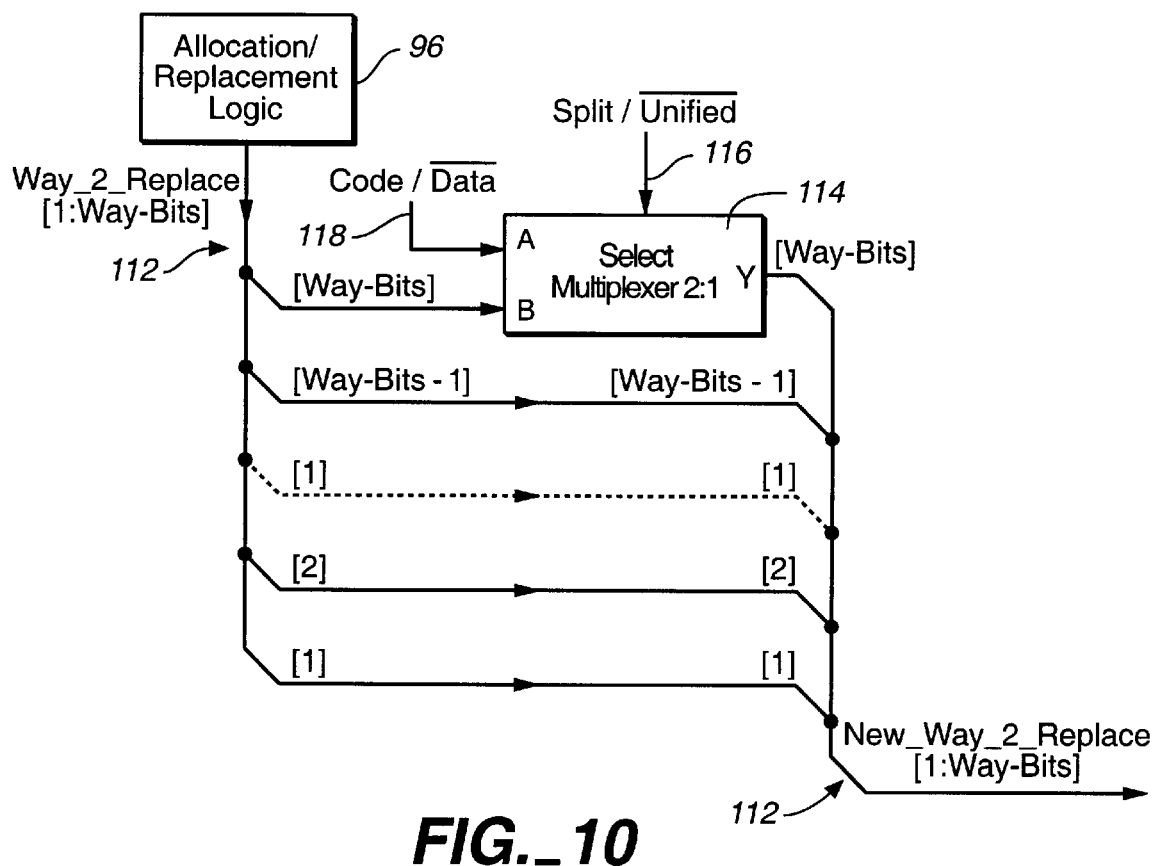
FIG._10
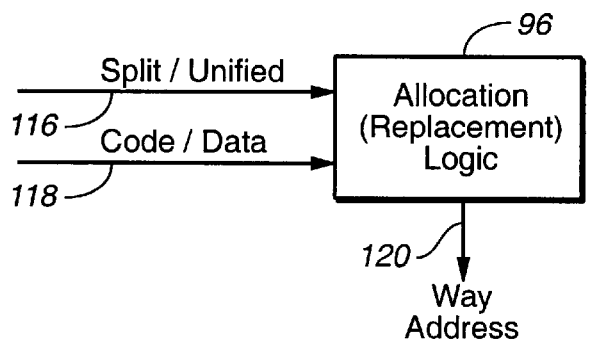
FIG._11

SET-ASSOCIATIVE CACHE HAVING A CONFIGURABLE SPLIT AND UNIFIED MODE

FIELD OF THE INVENTION

The present invention relates to an architecture for a set-associative cache. In particular, the invention is directed to a cache which is selectively configurable as either a unified cache or a split cache.

BACKGROUND TO THE INVENTION

FIG. 1 shows schematically a conventional configurable-architecture cache 10. The cache can either be configured as a single (unified) cache 12 for treating both data and instructions in the same cache area (FIG. 1a), or the cache can be configured as two (split) caches 14 and 16 for treating data and instructions in different cache areas (FIG. 1b). The optimum configuration depends on the way in which data and instructions are organised, in particular on the instruction code structure and the data accesses a program performs. Since this is software specific, the cache is controllable so that either the unified mode or the split mode can be selected by the software, by writing a control value to an appropriate control register in the cache.

Caches may also be classified into various types according to their address mapping. In an associative cache, there are a plurality of internal addresses in the cache's memory which can be accessed to map to an external address. In a fully associative cache, data from any external address can be stored at any location within the cache's memory. While a fully associative cache could provide best cache performance, it involves huge amounts of control logic, and results in increased power consumption.

A direct mapped cache uses a fixed address mapping scheme, such that each external address is mapped to a fixed internal address in the cache's memory. Since the cache memory is typically several orders of magnitude smaller than the overall external address range, certain bit positions in the external address are normally selected to define the mapped address in the cache memory. External addresses which have the same bits in the selected bit positions therefore map to the same internal address, and form a so-called addressing "set" in the cache. A direct mapped cache is relatively easy to implement with low gate count, and has only a small power consumption. However, the cache performance is lower, since subsequent accesses to the memory locations which map onto the same set will always overwrite currently buffered data.

A so-called set-associative cache combines elements of association and direct mapping, and is often used as a compromise between the amount of control logic and the power consumption on the one hand, and cache performance on the other. In a set-associative cache, direct mapping is used so that external addresses map to a set according to certain bits of the address. However, within each set, there are a plurality of possible internal addresses (or "ways") which can be used for the external address. The particular way to be allocated for an external address depends on whether any ways in that set are currently unallocated; if not, then a replacement method is used to select which currently allocated way is to be overwritten (i.e., newly allocated).

FIG. 2 illustrates schematically an address area 20 of the cache memory divided into "n" sets 22, each set including a plurality of ways 24 (0 . . . k) for storing data mapped to that set. Each way 24 is defined as a cache line 26 for grouping a plurality of words 28 of bytes, so that each cache line 26 actually maps to a plurality of consecutive external address locations.

FIG. 3 shows how an external address 30 location is decoded to map a byte represented by the external address to the cache memory. The external address 30 has a width of b+w+s+t bits. From the address, certain bits 32 (s bits) define the set to which the external address is fixably mapped. The least significant bits 34 are used as an index to define the location of the byte in a cache line 26 of the set. The least significant bits 34 are divided into two groups 36 (w bits) and 38 (b bits), the bits 36 representing the location in the cache line of a word containing the byte, and the bits 38 representing the location of the byte within that word. The most significant bits 40 (t bits) are not used to map the external address, but instead are saved as a tag 42 (FIG. 2) associated with the cache line 26, so that the full addresses represented by each cache line are known. Referring to FIG. 2, each cache line 26 also includes valid (or "validation") bits 44 for indicating whether the words 28 in the cache line actually contain valid data.

When a set-associative cache is used in a configurable unified/split mode architecture, a conventional approach for implementing the split mode is to split the sets into two groups. Typically, half the sets are used for the data cache area, and half the sets are used for the instruction or code cache area. For example, in FIG. 2, the sets 0 . . . ((n/2−1) would be used to define a data area 46, and the other sets n/2 . . . n−1 would be used to define an instruction or code area 48.

Although this seems an eminently logical approach, a resulting complication is that the number of available sets to which an external address is mapped varies in dependence on the operating mode. In the unified mode, then the address is mapped to n sets. In the split mode, the same address range (assuming that both data and instructions can lie anywhere in the address range) has to be mapped to only n/2 sets. FIG. 4 illustrates how the address range is mapped in the case of a split mode. It can be seen that since the number of available sets is reduced to only half, the number of bits s' to define the set 32 is reduced by one bit (s'=s−1). Similarly, the number of bits t'to define the tag 40 has to be increased by one bit (t'=t+1), in order to accommodate the same address range. This results in variable length set and tag fields 32 and 40, depending on whether the split or unified cache mode is selected. Additional logic is therefore required to handle the variable length fields, such as that illustrated schematically in FIG. 5.

Referring to FIG. 5, the additional logic overhead consists of a first multiplexer 50, a second multiplexer 52 and a gate 54, for each way 24 defined in a set, in order to decode (map) an external address in either the split mode or the unified mode. Essentially, the multiplexers 50 and 52 and the gate 54 are all required to accommodate one bit 58 of the address which may either be part of the set field 32 or part of the tag field 40, depending on whether the cache is operating in its unified or split mode.

A further disadvantage is that it is not possible to dynamically switch the cache between its unified and split modes while in use, because the address mapping is different in either mode. Therefore, if a switch is required, it is necessary to flush the entire contents of the cache, since data mapped in the cache in one mode is not compatible with the other mode.

A yet further disadvantage is that the tag memory is not used efficiently in this implementation as one bit remains unused in unified mode. The tag memory is memory which is reserved for storing the tag information, and each memory location has to be sufficiently long to accommodate the largest field, even though this only occurs in the split mode.

SUMMARY OF THE INVENTION

The present invention concerns a set-associative cache having a selectively configurable split/unified mode. The cache may comprise a memory and control logic. The memory may be configured for storing data buffered by the cache. The control logic may be configured for controlling the writing and reading of data to and from the memory. The control logic may organise the memory as a plurality of storage sets, each set being mapped to a respective plurality of external addresses such that data from any of said respective external addresses maps to that set. The control logic may comprise allocation logic for associating a plurality of ways uniquely with each set, the plurality of ways representing respective plural locations for storing data mapped to that set. In the unified mode, the control logic may assign a first plurality of ways to each set to define a single cache region. In the split mode, the control logic may partition the first plurality of ways to define a first and a second sub-group of ways assigned to each set, to define a respective first and second cache region.

The objects, features and advantages of the invention include providing a set-associative, configurable split/unified mode, cache that may (i) use the same number of sets to map an external address range irrespective of the split or unified mode, (ii) simplify the decoding logic required to decode an external address in either the split or unified mode, (iii) enable dynamic switching of the cache between the split and unified modes while preserving the cached contents (i.e. without having to flush the cache); and/or (iv) avoid redundancy in the tag memory

BRIEF DESCRIPTION OF THE DRAWINGS

These and other objects, features and advantages of the present invention will be apparent from the following detailed description and the appended claims and drawings, in which:

FIGS. 1a and 1b are schematic diagrams showing the principle behind a conventional configurable split/unified cache;

FIG. 2 is a schematic diagram showing the principle of data organisation in a conventional set-associative cache;

FIG. 3 is a schematic diagram showing the conventional mapping of an external address in a set-associative cache;

FIG. 4 is a schematic diagram similar to FIG. 3 showing the modification to the mapping for a split mode operation of the cache;

FIG. 5 is a schematic block diagram showing an example of decoding logic for a conventional configurable mode set-associative cache;

FIG. 6 is a schematic block diagram of a cache in accordance with an embodiment of the invention;

FIG. 7 is a schematic diagram showing the principle of data organisation in the cache of FIG. 6;

FIG. 8 is a schematic diagram showing the mapping of an external address in either mode of the cache;

FIG. 9 is a schematic block diagram showing an example of decoding logic for an external address;

FIG. 10 is a schematic block diagram showing a control of the ways if the same replacement method is used in the unified and split modes; and FIG. 11 is a schematic view of a modified allocation logic block.

DETAILED DESCRIPTION OF PREFERRED EMBODIMENTS

Referring to FIG. 6, a configurable split/unified mode, set-associative, cache circuit 60 is shown. The cache 60 is typically implemented in an integrated circuit, either on its own or in combination with other circuits (for example, a processor, cached memory, etc.). The cache circuit 60 comprises a CPU bus interface 62 for coupling to a CPU bus, a peripheral bus interface 64 for coupling to a peripheral (cached) bus, and an internal memory 66 for storing buffered data within the cache. Bi-directional buses 68 from the interfaces 62 and 64 and from the memory 66 are linked by a multiplexer 70 which functions to route data between the buses 68. The interfaces 62 and 64, the memory 66 and the multiplexer 70 are controlled by control signals 72 from control logic 74. The control logic 74 functions on a global level to control the operation of the cache 60 and, in particular, controls the allocation of internal memory for buffering data in response to read and write accesses received through the CPU bus interface 62.

Referring to FIG. 7, the internal memory space is organised as "n" sets 80 (0 . . . n−1), each set 80 comprising a plurality of locations or blocks or "ways" 82 (0 . . . k) for storing data mapped to that set. Each way 82 is defined as a cache line 84 which comprises a tag field 86, a plurality data words 88, and one or several valid (or "validation") bits 90 associated with the data words 88 for indicating their validity (e.g., whether the words or the whole cache line contain valid data or whether no data has yet been written).

FIG. 8 shows how an external address 92 location is decoded to map a byte represented by the external address to the cache memory. The external address 92 has a width of b+w+s+t bits. From the address, certain bits 94 (s bits) define the set 80 to which the external address is fixably mapped. The control logic 74 (FIG. 6) includes an allocation section 96 for controlling, for the set, which way 82 (FIG. 7) is allocated to the external address 92 for storing the data corresponding to the external address 92. Generally, if any of the ways 82 are currently unallocated, then one of the unallocated ways 82 is selected to be allocated to the external address 92. If there are no unallocated ways 82, then a replacement method is used to decide which way 82 to newly allocate.

Referring again to FIG. 8, the least significant bits 98 are used as an index to define the location of the byte in the cache line 84 of the allocated way 82. The least significant bits 98 are divided into two groups 100 (w bits) and 102 (b bits), the bits 100 representing the location in the cache line 84 of a word containing the byte, and the bits 102 representing the location of the byte within that word. The most significant bits 104 (t bits) are not used to map the external address 92, but instead are saved as the tag data 86 (FIG. 7) associated with the cache line 84.

The cache 60 is configurable as either a unified cache (in which the cache memory is treated as a single area for both data and instructions) or as a split cache (in which the cache memory is treated as two separate areas for data and for instructions). The configuration mode is controlled by a control value stored in a configuration register 106 in the control logic 74.

In contrast to the conventional approach illustrated in FIGS. 2–5 of splitting the sets into two smaller groups to define data and instruction areas, the present embodiment maintains the same number of sets 80 for both data and instructions in both the unified mode and the split mode. In other words, in both the unified and split modes, the external address is always mapped to one of the "n" sets 80, and each set can contain both data and instructions. Instead, the partition between data and instructions is provided by partitioning the number of ways 82 (0 . . . k) in each set 80 into two groups 108 and 110. In this embodiment, the ways are partitioned into two halves. The first group (half) 108 is used for storing data, and the second group (half 110 is used for storing instructions.

The partitioning of the ways 82 in each set 80, instead of partitioning the sets 80 themselves, has a major impact in that mapping of an external address to a set 80 is the same in both the unified mode and the split mode. In essence, the partitioning is removed from the address mapping to a set 80, and is instead implemented in an internal pointer for the internal locations allocatable to each set 80.

A major advantage is that the decoding logic required to map an external address to the cache in either mode can be simplified. Since the same number "n" of sets is used to map an external address in both modes, the set field 94 and the tag field 104 of the external address do not vary in length (in contrast to the conventional implementation shown in FIGS. 2–5). Therefore, simple control logic, such as that shown in FIG. 9, can be used for decoding an external address. Referring to FIG. 9, since the set field 94 and the tag field 104 always have fixed lengths, no additional multiplexers are needed to selectively accommodate varying length fields. The decoding logic can be as simple as that for a single-mode cache, because the address mapping to the sets 82 does not depend on whether the cache is set to unified mode or to split mode. A further advantage is that, since the address (set) mapping is the same in both modes, it is possible to switch the cache dynamically between its unified and split modes without having to flush the cache. Data written in either mode is compatible with the other mode. A yet further advantage is that, since the length of the tag field 104 does not change, there is no redundancy in a tag memory used for storing the tag data.

Referring to FIG. 10, the partitioning of the ways 82 in each set 80 is implemented by controlling the most significant bit of the bus (the "way bus") 112 which addresses the ways 82 in a set 80. The most significant bit defines whether the way address is in the first half 108 or the second half 110 of the way address range. A multiplexer 114 is coupled to the output of the allocation logic 96 in the control logic 74, for controlling the most significant bit, without modifying the other bits of the way address. The multiplexer 114 is controlled by a SPLIT/UNIFIED mode control signal 116, and also receives a CODE/DATA signal 118 for distinguishing between the instruction (code) and data areas of the cache when in the split mode.

When the cache is operating in its unified mode (defined by the SPLIT/UNIFIED signal 116 being a logical-0), the multiplexer 114 selects the output from the allocation logic 96 for the most significant bit of the way address. When the cache is operating in its split mode (defined by the SPLIT/UNIFIED signal 116 being a logical-1), the multiplexer selects the CODE/DATA signal 118 for outputting as the most significant bit of the way address. The CODE/DATA signal 118 therefore selects either the first half 108 or the second half 110 of the ways depending on whether the CODE/SIGNAL is logical-0 (e.g., for data) or logical-1 (e.g., for instruction code).

If the replacement method used for a unified mode is also used unchanged for the split mode, then in the split mode the cache will start to use the full associativity for both instructions (code) and data within one set 80 until all ways 82 of this set 80 are filled. The reason for this is that the allocation logic 96 will normally try to replace all of the unallocated ways 82 before using the replacement method to overwrite existing allocations. However, if the allocation logic treats the ways 82 as a single area, then anomalous allocations can occur in the split mode if an unallocated way 82 is detected in one group 108 when an allocation is required for the other group 110. Therefore, full associativity only becomes possible when all ways 82 in both groups 108 and 110 have been allocated (since there are then no unallocated ways 82 which might affect the allocation logic).

Also, if the same replacement method is used without modification for both unified and split modes, it is preferred that this method either be of the so-called round-robin replacement type, or of a random replacement type. In a round robin replacement method, the ways 82 are selected for replacement in a repeating sequence. In a random replacement type, the ways 82 are selected on a random (or pseudo-random) basis.

FIG. 11 illustrates (schematically) an alternative embodiment in which the allocation logic 96 is controllable to implement either a dedicated allocation/replacement method for the unified mode, or parallel dedicated allocation/replacement methods for the data and address areas in the split mode. The control logic 96 receives the SPLIT/UNIFIED signal 116 and the CODE/DATA signal 118 described above, and generates a way address output 120 which is tailored to either the unified mode or the split mode of operation. This alternative embodiment is suited to implementing any replacement method, for example the round-robin and random methods described above, or a so-called Least Recently Used (LRU) method in which the least recently accessed way is selected for replacement.

The foregoing description is merely illustrative of preferred examples of the invention, and is not intended to limit the invention in any way. The skilled man will also readily understand that many modifications, equivalents and improvements may be used within the scope and principles of the invention, and the appended claims are intended to be interpreted broadly to include all such modifications, equivalents and improvements.

What is claimed is:

1. A set-associative cache having a selectively configurable split/unified mode, comprising:

a memory for storing data buffered by said cache; and control logic for controlling the writing and reading of data to and from said memory;

wherein:

said control logic organizes said memory as a plurality of storage sets, each said set being mapped to a respective plurality of external addresses such that data from any of said respective external addresses maps to said set; and said control logic comprises allocation logic for associating a plurality of ways uniquely with each said set, said plurality of ways representing respective plural locations for storing data mapped to said set;

wherein:

in said unified mode, said control logic assigns a first plurality of ways to each said set to define a single cache region; and in said split mode, said control logic partitions said first plurality of ways to define a first and a second sub-group of ways assigned to each said set, to define a respective first and second cache region.

2. The cache according to claim 1, wherein said control logic organises said memory to have a same number of said sets in said unified mode as in said split mode.

3. The cache according to claim 1, wherein said control logic maps each said set to said external addresses, said external addresses for each said set being the same in said unified mode as in said split mode.

4. The cache according to claim 1, wherein said control logic maps each said set to said external addresses in dependence on bits in said external address at predetermined bit positions.

5. The cache according to claim 4, wherein said predetermined bit positions are the same in said unified mode as in said split mode.

6. The cache according to claim 4, wherein said bits having a significance less than said predetermined bit positions are mapped as an index in said way.

7. The cache according to claim 4, wherein said control logic stores said bits of said external address having a significance greater than said predetermined bit positions, as an indicator tag for said way.

8. The cache according to claim 1, wherein said control logic comprises an address decoder for decoding said external address to map said external address to said sets independently of said unified or split mode.

9. The cache according to claim 1, wherein said control logic comprises a control register for storing control data for selecting said unified mode or said split mode.

10. The cache according to claim 1, wherein said control logic further comprises logic for allocating said way for storing data associated with an external address, said logic being responsive to said mode.

11. The cache according to claim 1, wherein one of said sub-groups is for storing data and another of said sub-groups is for storing instructions.

12. A method of operation in a set-associative cache selectively configurable in a unified/split operating mode, said method comprising the steps of:
 (A) organizing a memory of said cache as a plurality of sets, each said set being mapped to a respective plurality of external addresses such that data from any of said respective external addresses maps to said set;
 (B) associating a plurality of ways uniquely with each said set, said plurality of ways representing respective plural locations for storing data mapped to said set;
 wherein step (B) comprises:
  (B1) associating a first plurality of ways to each set to define a single cache region in said unified mode; and
  (B2) partitioning said first plurality of ways to define a first and a second subgroup of ways associated with each said set, to define a respective first and second cache region in said split mode.

13. The method according to claim 12, wherein a number of said sets in said unified mode is the same as a number of said sets in said split mode.

14. The method according to claim 12, wherein said external addresses to which each said set maps are the same in said unified mode as in said split mode.

15. The method according to claim 12, wherein each said set maps to said external addresses in dependence on bits in said external address at predetermined bit positions.

16. The method according to claim 15, wherein said predetermined bit positions are the same in said unified mode as in said split mode.

17. A set-associative cache having a selectively configurable split/unified mode, comprising:
 means for organizing a memory of said cache as a plurality of storage sets, each said set being mapped to a respective plurality of external addresses such that data from any of said respective external addresses maps to said set;
 means for associating a plurality of ways uniquely with each said set, said plurality of ways representing respective plural locations for storing data mapped to said set;
 wherein said associating means comprises:
  means for associating, in said unified mode, a first plurality of ways to each said set to define a single cache region; and
  means for partitioning, in said split mode, said first plurality of ways to define a first and a second sub-group of ways associated with each said set, to define a respective first and second cache region.

* * * * *